US 6,601,799 B2

(12) United States Patent
Lau et al.

(10) Patent No.: US 6,601,799 B2
(45) Date of Patent: Aug. 5, 2003

(54) PASSENGER AIRCRAFT CABIN WINDOW CONSTRUCTION

(75) Inventors: Michael Lau, Dollern (DE); Sven Schaich, Neu Wulmstorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/121,026

(22) Filed: Apr. 10, 2002

(65) Prior Publication Data

US 2002/0145081 A1 Oct. 10, 2002

(30) Foreign Application Priority Data

Apr. 10, 2001 (DE) .......................................... 101 17 964

(51) Int. Cl.[7] ................................................. B64C 1/14
(52) U.S. Cl. .................................. 244/129.3; 296/146.1
(58) Field of Search .................... 244/129.3; 296/146.1, 296/146.15

(56) References Cited

U.S. PATENT DOCUMENTS

| 2,575,757 A | | 11/1951 | Hardy | |
| 3,429,530 A | | 2/1969 | Hertel | |
| 4,364,533 A | | 12/1982 | Pompei et al. | |
| 4,541,595 A | * | 9/1985 | Fiala et al. | ............... 244/129.3 |
| 5,662,152 A | * | 9/1997 | Sanz et al. | ................ 160/84.02 |
| 6,227,491 B1 | * | 5/2001 | Stephan et al. | ........... 244/129.3 |

FOREIGN PATENT DOCUMENTS

| DD | 23321 | 6/1962 |
| DE | 1252533 | 10/1967 |

* cited by examiner

Primary Examiner—J. Woodrow Eldred
(74) Attorney, Agent, or Firm—W. F. Fasse; W. G. Fasse

(57) ABSTRACT

An aircraft passenger cabin window construction is formed by a casing of modular elements that are easily assembled and permit using substantially larger inner window panes compared to the area size of outer window panes thereby avoiding forming a funnel configuration or effect. For this purpose a window sill (8) is provided with lateral upward extensions (8B) and (8C) to provide a U-configuration that is held in place by casing elements (6) and (7). The casing elements (6, 7) may simultaneously form inner cabin wall panels and also reach upwardly with extensions (6A) and (7A) to form a further U-configuration cooperating with the first mentioned U-configuration of the sill (8). The upper open end of the two U-configurations is closed by a casing element (10). An inner window pane is supported or covered by the window sill. A central casing element (9) extending vertically may divide the U-shaped configurations into at least two sections.

20 Claims, 2 Drawing Sheets

PASSENGER AIRCRAFT CABIN WINDOW CONSTRUCTION

PRIORITY CLAIM

This application is based on and claims the priority under 35 U.S.C. §119 of German Patent Application 101 17 964.2, filed on Apr. 10, 2001, the entire disclosure of which is incorporated herein by reference.

FIELD OF THE INVENTION

The invention relates to a window casing and a window construction with such a casing for passenger cabins, particularly in a commercial aircraft. The casing elements are provided for at least one cabin window including an inner window pane and an outer window pane.

BACKGROUND INFORMATION

Conventional passenger cabin windows in a commercial airliner must be pressure-tight due to the pressure differential to which the aircraft body or fuselage is exposed during flight. It is quite common to use individually installed small outer windows in order to keep any weakening of the fuselage structure as small as possible. Such small cabin windows are, for example, disclosed in German Patent Publications DE 1,252,533, or DDR Patent Publication 23,321, or in U.S. Pat. No. 2,575,757.

German Patent Publication 1,252,533 (Hertel) discloses an aircraft cabin in a fuselage with an elongated window frame carrier that is integrated into the fuselage and carries a plurality of windows in a side by side arrangement. The windows are formed by two or three uninterrupted window pane bands that extend in parallel to each other and are supported by and secured to the elongated window frame carrier. The impression of a plurality of windows is provided by the struts that form part of the window frame carrier. The inner and outer window panes appear to be of equal size.

East German Patent Publication (former DDR) 23,321 discloses a double window for pressurized aircraft cabins, wherein the outer window pane is held in place by a spring elastic ring collar which in turn is fixed in place by the mounting of the inner window pane. The outer window pane surface area appears smaller than the inner window pane surface area since the ring collar forms a conical taper.

U.S. Pat. No. 2,575,757 (Hardy) discloses a window for pressurized chambers such as aircraft cabins. For safely accommodating a pressure differential between the inside and the outside of the cabin, two window panes are used. The space between the two panes is vented to the atmosphere. The outer pane is flush with the outer skin of the aircraft while the inner pane is vaulted either inwardly in compression or outwardly in tension. The window frame or casing and the seal of the panes in the frame is so constructed that the proper sealing of the inner panel is established by an excess pressure in the cabin.

Generally, conventional aircraft windows comprise an outer window pane and an inner window pane enclosing an intermediate space between the window panes. This intermediate space is surrounded by a window frame. The window frame is conventionally referred to as a window funnel because it tapers from the larger inner window pane outwardly toward the smaller outer window pane. The inner window pane having a larger surface area, is a portion of the passenger cabin inner wall and the spacing between the outer window pane having a smaller surface area, and the inner window pane has a fixed dimension which is given by the structural depth of the aircraft fuselage wall between the aircraft outer skin and the inner paneling of the passenger cabin. Due to the different surface area sizes of the inner and outer window panes a so-called funnel effect is created in conventional cabin window constructions, whereby the outer windows appear much smaller and create a confining effect on passengers. Further, conventional aircraft cabin windows have a single piece inner casing which prevents using more flexible window casing configurations inside the cabin. Moreover, such single piece inner casings create a uniform overall impression of the passenger cabin.

OBJECTS OF THE INVENTION

In view of the foregoing it is the aim of the invention to achieve the following objects singly or in combination:

- to construct an aircraft cabin window casing in such a way that with the help of different variable window casing elements the configurational appearance of the window or windows and of the cabin interior can be changed with little effort and expense;
- to avoid the conventional funnel effect which creates a confining space impression inside an aircraft cabin; and
- to modularize the construction of aircraft cabin windows in such a way that the wishes of the buyer of a commercial airliner are more easily accommodated.

SUMMARY OF THE INVENTION

An aircraft passenger cabin window casing according to the invention comprises a plurality of modular window casing elements that together form a modular window casing unit preferably, but not necessarily having an upwardly open U-configuration, whereby a window frame funnel configuration in the form of a conically tapering collar or fairing is avoided. At least one lower casing element forms lower and lateral window frame components. Preferably, but not necessarily, at least one upper casing element closes the upwardly open casing unit upwardly toward a cabin ceiling. An upwardly open intermediate casing element also preferably having a U-configuration forms a window sill held in place by the at least one lower casing element which has an upwardly facing edge that forms a mounting for the window sill. The window sill in turn is positioned below at least one inner window pane. Preferably, the sill holds the inner pane in place.

According to the invention there is further provided an aircraft cabin window with at least one outer window pane and an inner window pane that has a surface area configuration different from a surface area configuration of the outer window pane. The panes are spaced from each other by a collar and surrounded by the present window casing, whereby a funnel shape is avoided for said collar.

It is a special advantage of the invention that the use of a plurality of window casing elements permits creating a generous optical space impression of the cabin space. A multitude of possibilities is opened for the construction of the lateral inner wall areas of the passenger cabin around and near the window. A window casing according to the invention permits flexibly accommodating customer requirements, whereby decor cabin modifications can be made at little extra effort and expense. The plurality of window casing elements can be shaped as decor components in accordance with the requirements of different aircraft models and different interior wall appearances, whereby different colors may be used. Since each of the plurality of window casing elements are modular elements that can be preassembled into smaller modular assembly units, it is now possible to install or replace window casing elements in a more efficient manner because these elements are more easily handled since individually the present casing elements are smaller than conventional aircraft window casings. Thus, the assembly effort and expense has been reduced.

It is preferred that at least two first casing elements are provided which are shaped to have a downwardly reaching extension that forms a cabin wall covering or panel below the window casing proper. Each of the two first casing elements has an upwardly reaching casing component extending laterally alongside the cabin window construction. The two first casing elements have a mirror-symmetrical configuration relative to each other.

The inner window panes now can have any desired shape or surface area configuration and are thus not limited to the area configuration or outline of the outer window panes of an aircraft cabin window. A window casing element or panel having a vertical orientation is preferably provided to separate two inner window panes that are surrounded by a common casing. The vertical casing element can thus, for example, cover a fuselage component such as a rib of the aircraft fuselage.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
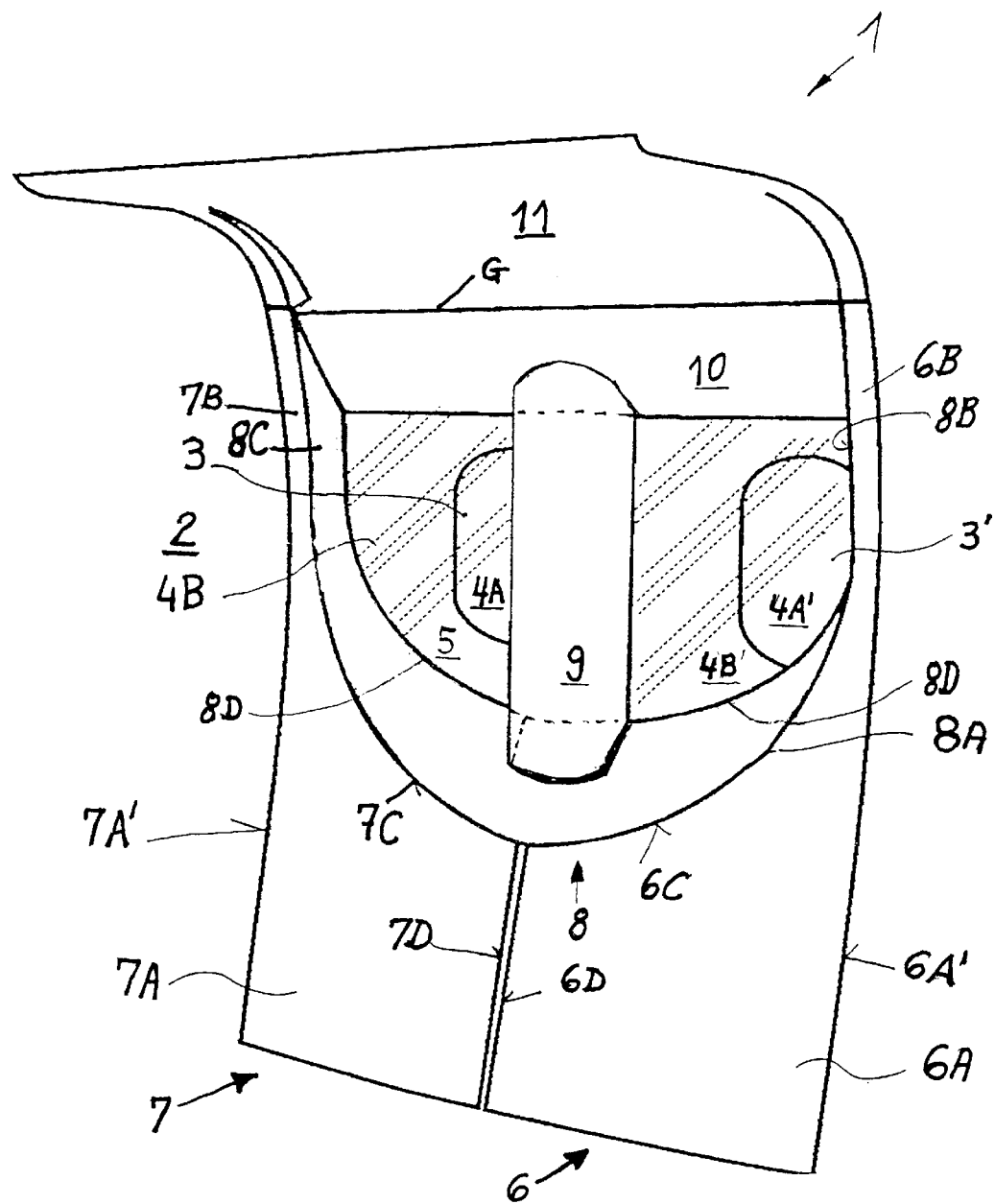
FIG. 1 is a perspective view of a cabin window construction according to the invention illustrating a window casing that surrounds two cabin windows.

FIG. 1 shows a perspective view of the present aircraft cabin window construction 1 installed in an aircraft fuselage enclosing an aircraft cabin 2. The present window construction 1 has a frame or casing that surrounds or encloses, for example, two cabin windows 3 and 3'. The casing comprises a plurality of casing elements 6, 7, 8, 9, 10, 11. At least one, preferably two upwardly open lower first casing elements 6 and 7 form lower and lateral casing or frame components. A downwardly reaching extension 6A, 7A of each lower casing elements 6, 7 forms simultaneously part of an inner cabin wall covering or paneling. Lateral upwardly reaching extensions 6B and 7B form lateral casing components. The downwardly reaching casing components or extensions 6A and 7A have upwardly facing edges 6C and 7C that form a mounting for a second casing element that is a window sill 8 to be described in more detail below. A third casing element 10 preferably closes the casing upwardly toward a ceiling panel 11 that is a fourth casing element. The just described casing elements are modular units that can be easily assembled to in turn form a modular casing assembly. The use of the third casing element 10 is preferred for forming a space or gap G in which a lighting fixture 12 may be mounted. Instead or additionally, the gap G may function as an air flow channel.

Figure 2:
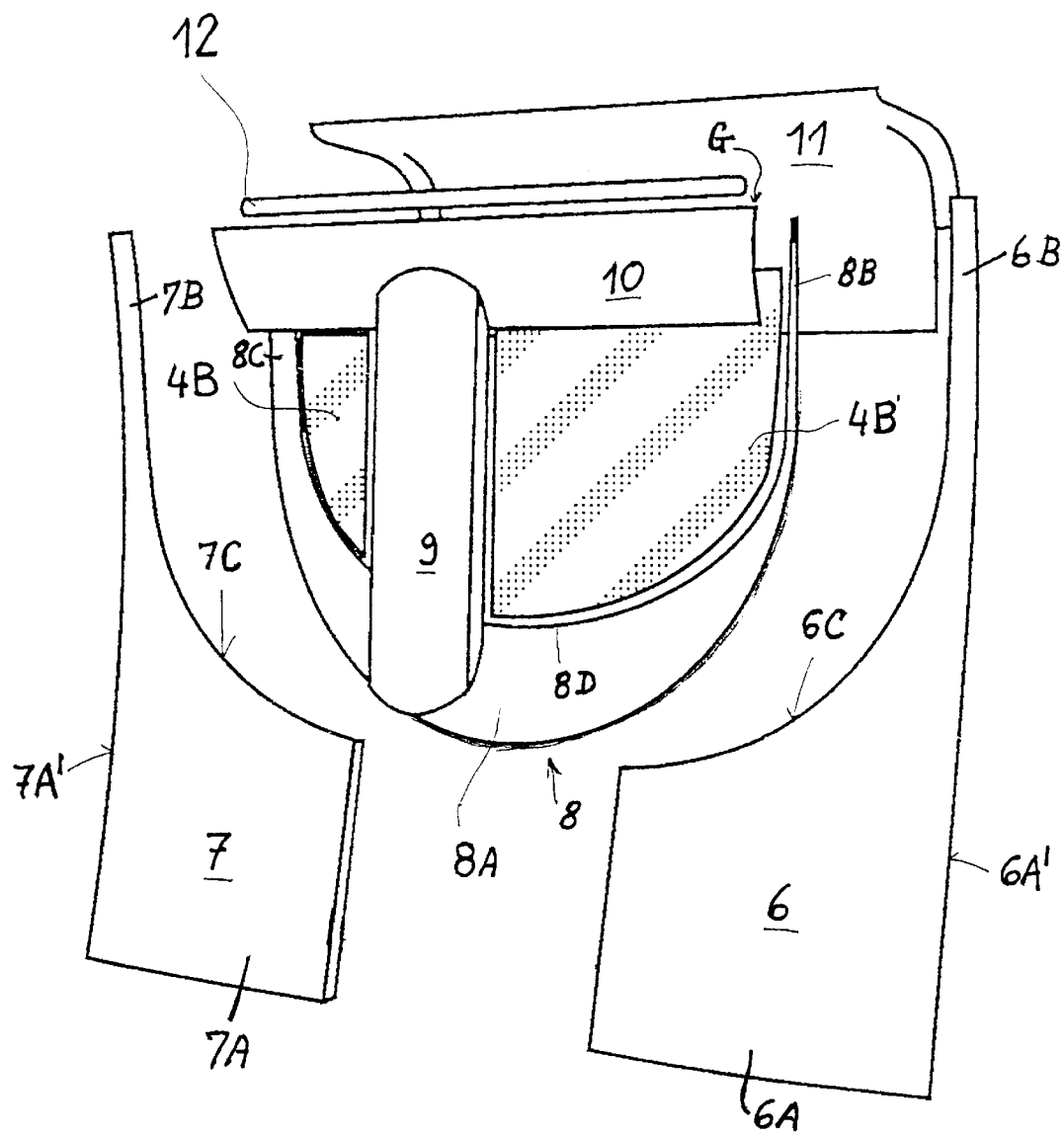
FIG. 2 is an exploded view of a window casing embodiment that cooperates with a ceiling panel to form a recess for a lighting fixture and/or an air flow duct.

FIG. 2 shows the plurality of window casing elements 6 to 11 in an exploded view to facilitate the illustration. The window casing elements include the above mentioned lower first casing elements 6 and 7 with their inner cabin wall extensions or panels 6A, 7A. The second casing element forms the window sill 8 preferably having a curved upwardly open U-configuration with lateral sill extensions 8B, 8C rising from a central sill section 8A. The central sill section 8A and the sill extensions 8B, 8C have a window pane facing edge 8D. The optional third casing element 10 forms an upper lighting shade 10. The fourth casing element forms a ceiling panel 11 that cooperates with the lighting shade 10 to form a space or gap G for the lighting fixture 12 and/or for an air flow channel. Depending on the size of the window casing elements, more than one window 3, 3', can be encased by the present window casing as shown in FIG. 1. A fifth casing element 9 forms a covering panel that may, for example, cover a fuselage rib not shown. The element 9 forms a central vertically arranged panel member or divider 9.

As shown in FIG. 1, the cabin windows 3, 3' each comprise a relatively small outer window pane 4A and 4A', as well as larger inner window panes 4B, and 4B'. The inner window panes 4B and 4B' can be substantially larger in surface area size, e.g. twice as large, than the outer window panes 4A and 4A' due to the construction of the window casing according to the invention. Even more important the surface area configuration of the larger inner window panes 4B, 4B' may differ substantially from the surface area configuration of the smaller outer window panes 4A, 4A' as best seen in FIG. 1. Thus, a relatively large viewing area is provided without a funnel effect. Further, the curved lower window sill 8 with its central portion 8A and with its lateral sill extensions 8B and 8C does not form a funnel configuration. Rather, the window sill 8 with its lateral extensions 8B and 8C preferably forms an upwardly open U-configuration and cooperates with the casing element 10 that forms a lighting shade to be described in more detail below.

In the area between the outer window panes 4A, 4A' and the inner window panes 4B and 4B' an intermediate casing frame or cover 5 is provided as shown in FIG. 1. This cover 5 also has an upwardly open configuration to avoid forming a funnel impression to thereby create the impression of a larger viewing area. The cover 5 has a flat central portion that covers the area between the two windows 3 and 3'.

The casing elements 6 and 7 preferably form part of the inner cabin wall paneling, particularly with the casing extensions 6A and 7A reaching downwardly below the window. Preferably, two such casing sections 6 and 7 are provided and constructed to be mirror-symmetrical relative to each other. The lateral edges 6A' and 7A' of the casing elements 6 and 7 are constructed for cooperation with neighboring passenger cabin inner wall panels not shown. The connection to neighboring panels along the edges 6A' and 7A', the connection between edges 6D, 7D between neighboring casing elements 6 and 7 and the connection of all of the casing elements to the aircraft structure is accomplished by conventional mounting elements such as snap fasteners, interacting edges, covered screws and the like for securing the casing elements to the aircraft fuselage structure. These mounting elements are not part of the invention.

The connection of the two casing elements 6 and 7 along the edges 6D, 7D that face each other in the center of FIG. 1 is as mentioned conventional and may be covered by a strip. Each of the casing elements 6 and 7 has as curved upwardly facing edge 6C and 7C respectively. These upwardly facing edges and laterally inwardly facing edges are provided, for example, with a U-shaped groove into which an edge of the curved lower window sill 8 is inserted. The window sill 8 preferably has a U-shaped configuration with a central curved lower central portion 8A and with the above mentioned upwardly extending lateral extensions 8B and 8C. The sill 8 covers the mounting of the inner window panes 4B, 4B' to the structure of the aircraft fuselage. The sill 8 bridges the space between the inner panes 4B, 4B' and the first casing elements 6, 7 downwardly and laterally while the upper covering of the inner window pane 4B, 4B' is achieved by the above-mentioned lighting shade 10. In an alternative embodiment the just described window sill 8, 8A, 8B, 8C itself can be structured as a mounting for the inner window pane or panes 4B, 4B'.

According to a further aspect of the invention the fifth casing element 9 is vertically oriented and forms a central panel 9 positioned with its lower end against the window sill 8 and with its upper end against the light shade 10, whereby the inner window panes 4B, 4B' may be separated from one another. The separation is covered by the vertical central panel 9 which can be so positioned that it also covers aircraft fuselage components such as a rib or the like, not shown. The transition area between the inner window pane 4B and the inner window pane 4B' is fully covered by the vertical central panel 9. This casing element or panel 9 can be constructed to have various decorative outer configurations including different color coatings on the surface of the casing element 9 facing into the cabin. Different materials may be used for making the panel 9 of wood, metals, e.g. stainless steel or aluminum, plastics, lacquer coated materials and decor film or foil covered materials.

Furthermore, it is possible according to the invention that the inner window panes 4B and 4B' are replaced by a single inner window pane, whereby the central casing element or panel 9 need not necessarily perform a covering function, but remains useful as a decorative component of the entire window casing. For example, the central casing element or panel 9 may be light transparent and cover a lighting fixture. In such an embodiment the casing element or panel 9 may be provided with a light reflecting layer. Thus, it is possible to provide a first-class aircraft cabin with a different decor than a tourist cabin, thereby avoiding the conventional uniform impression. A complete exchange of the entire inner cabin paneling is no longer necessary when a cabin space is to be remodeled in accordance with different decor requirements or customer wishes, because many arrangement possibilities of the modular window casing elements is now possible.

The above mentioned light shade 10 is so positioned that its ends cooperate with the upward extensions 8B and 8C of the window sill 8 to thereby close the window casing with its sill upwardly. The shade 10 is preferably made of light transparent material as mentioned. The vertical casing element or panel 9 may support with its upper end the shade 10 as best seen in FIG. 2. The lighting fixture 12 is mounted in the space or gap G behind the shade 10 and between the shade 10 and the ceiling panel 11. The lighting fixture 12 holds preferably a fluorescent bulb. The panel 11 forms a transition between the upper edge of the inner window pane 4B, 4B' and the ceiling of the aircraft cabin. The ceiling itself is not shown. The gap G between the shade 10 and the transition panel 11 permits various modifications of the lighting fixtures with regard to their type as well as with regard to their position in the gap G. For example, the casing elements 10 and 11 may form a slot that permits light to be directed toward the ceiling or a back cut or slot may be provided that is open downwardly for an indirect cabin illumination. Additionally or instead of a lighting fixture the mentioned slots may be used for an air flow opening. In that case, the cover 10 is preferably not light transparent. The transition panel 11 may preferably be coated at least partially with a light reflecting layer. A lighting fixture behind the cover 10 may be so positioned as to direct light upwardly against the ceiling as mentioned and downwardly into the cabin. Similarly, conditioned air may be directed upwardly and/or downwardly.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A passenger aircraft cabin window casing comprising a plurality of modular casing elements forming a modular casing unit, said plurality of casing elements comprising at least one lower first casing element (6, 7) forming an upwardly open lower frame component (6A, 7A) and lateral frame components (6B, 7B), at least one upwardly open intermediate second casing element (8) forming a window sill as part of said window casing, said window sill (8) having a central lower sill portion (8A) and lateral upwardly reaching sill extensions (8B, 8C) along said lateral window frame components (6B, 7B), said at least one lower casing element (6, 7) having a sill facing edge (6C, 7C) forming a mounting for said window sill (8), said window sill (8) being positioned below at least one inner window pane (4B, 4B').

2. The cabin window casing of claim 1, further comprising at least one upper third casing element (10) cooperating with said lateral frame components (6B, 7B) for upwardly closing said upwardly open lower frame component, and at least one upper fourth casing element (11) forming a transition panel between said cabin window casing and a cabin ceiling, said at least one upper third casing element (10) and said upper fourth casing element being spaced from each other to form a gap (G).

3. The cabin window casing of claim 2, further comprising a lighting fixture (12) mounted in said gap (G).

4. The cabin window casing of claim 2, wherein said fourth casing element (11) forming said transition panel comprises a surface covered with a light reflecting coating.

5. The cabin window casing of claim 2, wherein said central lower sill portion (8A) and said lateral upwardly reaching sill extensions (8B, 8C) form an upwardly open U-configuration having a respective window pane facing edge (8D) for holding said at least one inner window pane (4B, 4B') in place.

6. The cabin window casing of claim 1, wherein said plurality of casing elements further comprise a fifth casing element (9) forming a central panel having a lower end positioned on said central lower sill portion (8A), said central panel extending upwardly and having a pane facing surface positioned in an area defined by said at least one inner window pane (4B, 4B').

7. The cabin window casing of claim 6, wherein said central panel of said fifth casing element (9) is constructed as a cover.

8. The cabin window casing of claim 6, wherein said central panel of said fifth casing element (9) is constructed as a mounting for said at least one inner window pane (4B, 4B').

9. The cabin window casing of claim 6, wherein said central panel of said fifth casing element (9) is light transparent.

10. The cabin window casing of claim 6, wherein said central panel of said fifth casing element (9) comprises a light reflecting surface.

11. The cabin window casing of claim 6, wherein said central panel of said fifth casing element (9) is made of any one of the following materials: wood, metals, plastics, lacquer coated materials and decor foil or film covered materials.

12. The cabin window casing of claim 6, further comprising at least one upper casing element (10) upwardly closing said upwardly open lower frame components, said central panel of said fifth casing element (9) having an upper end in contact with said at least one upper casing element (10).

13. The cabin window casing of claim 1, further comprising at least one upper casing element forming a third casing element (10) upwardly closing said upwardly open window frame components.

14. The cabin window casing of claim 1, wherein said at least one lower first casing element (6, 7) comprises two sections (6A, 6B) that are mirror-symmetrical to each other.

15. The cabin window casing of claim 14, wherein each of said two sections (6A, 7B) of said at least one lower first casing element comprises a downward extension forming an inner cabin wall paneling component.

16. An aircraft window construction comprising a window casing, at least one outer window pane and at least one inner window pane mounted in said window casing, said window casing comprising a plurality of casing elements forming a modular casing unit, said plurality of casing elements comprising at least one lower casing element forming upwardly open lower window frame components and lateral window frame components, at least one upwardly open intermediate casing element forming a window sill (8) as part of said window casing, said window sill having a central lower sill portion and lateral upwardly reaching sill extensions along said lateral window frame components, said at least one lower casing element having a sill facing edge (6C, 7C) forming a mounting for said window sill (8), and wherein at least one inner window pane is positioned above said window sill.

17. The aircraft window construction of claim 16, wherein said outer window pane has a first surface area configuration, wherein said inner window pane has a second surface area configuration different from said first surface area configuration and having an area size larger than an area size of said first surface area configuration of said outer window pane.

18. The aircraft window construction of claim 16, comprising at least two outer window panes arranged side by side, and wherein said at least one inner window pane has a surface area configuration and size for covering said at least two outer window panes.

19. The aircraft window construction of claim 16, wherein said at least one lower casing element has two sections that are mirror-symmetrical to each other.

20. The aircraft window construction of claim 19, wherein each of said two sections of said at least one lower casing element comprises a downward extension forming an inner cabin wall paneling component.

* * * * *